(12) United States Patent
Wang et al.

(10) Patent No.: US 11,524,878 B2
(45) Date of Patent: Dec. 13, 2022

(54) FIRST-ORDER DYNAMIC SLIDING MODE VARIABLE STRUCTURE-BASED BRIDGE CRANE ANTI-SWING METHOD

(71) Applicant: Wuyi University, Jiangmen (CN)

(72) Inventors: Tianlei Wang, Jiangmen (CN); Ainong Geng, Jiangmen (CN); Xinmo Li, Jiangmen (CN); Chang Zhou, Jiangmen (CN); Yaojiong Wu, Jiangmen (CN); Weitian Ni, Jiangmen (CN); Chuping He, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 455 days.

(21) Appl. No.: 16/651,180

(22) PCT Filed: Jun. 1, 2018

(86) PCT No.: PCT/CN2018/089510
§ 371 (c)(1),
(2) Date: Mar. 26, 2020

(87) PCT Pub. No.: WO2019/140830
PCT Pub. Date: Jul. 25, 2019

(65) Prior Publication Data
US 2020/0270103 A1    Aug. 27, 2020

(30) Foreign Application Priority Data

Jan. 22, 2018   (CN) .......................... 201810062153.7

(51) Int. Cl.
*B66C 13/06* (2006.01)
*G05B 13/04* (2006.01)
*B66C 13/46* (2006.01)

(52) U.S. Cl.
CPC ............ *B66C 13/063* (2013.01); *B66C 13/46* (2013.01); *G05B 13/042* (2013.01)

(58) Field of Classification Search
CPC ...... B66C 13/063; B66C 13/46; G05B 13/042
See application file for complete search history.

(56) References Cited

U.S. PATENT DOCUMENTS 5,785,191 A * 7/1998 Feddema .............. B66C 13/063
212/275
5,908,122 A * 6/1999 Robinett ............... B66C 13/063
901/17

(Continued)

FOREIGN PATENT DOCUMENTS

CN       101441441 A  *  5/2009
CN       101441441 A      5/2009

(Continued)

*Primary Examiner* — Nasim N Nirjhar
(74) *Attorney, Agent, or Firm* — Vivacqua Crane, PLLC

(57) ABSTRACT

A bridge crane anti-swing method based on first-order dynamic sliding mode variable structure includes steps of: constructing a two-dimensional bridge crane system model and a crane system control model, respectively; performing differentiation on two sliding mode surfaces containing swing angle dynamic change and rope length dynamic change to obtain a crane position dynamic sliding surface s1 and a rope length dynamic sliding mode surface s2, respectively; combining a displacement x, a length l and a swing angle θ in the two-dimensional bridge crane system model with the crane position dynamic sliding surface s1 and rope length dynamic sliding mod surface s2 in the crane system control model to obtain a relationship among a horizontal traction force f1, an along-rope traction force f2, the displacement x, the length l and the swing angle θ.

6 Claims, 2 Drawing Sheets

(56) References Cited

U.S. PATENT DOCUMENTS

| | | | |
|---|---|---|---|
| 6,904,353 B1* | 6/2005 | Kolavennu | F02D 41/0007 701/115 |
| 7,367,464 B1* | 5/2008 | Agostini | B66C 13/063 212/308 |
| 7,627,393 B2* | 12/2009 | Sawodny | B66C 13/063 700/228 |
| 8,235,229 B2* | 8/2012 | Singhose | B66C 13/063 212/275 |
| 2004/0164041 A1* | 8/2004 | Sawodny | B66C 13/085 212/273 |
| 2008/0275610 A1* | 11/2008 | Terashima | B66C 13/063 700/55 |
| 2013/0161279 A1* | 6/2013 | Schneider | B66C 13/06 212/232 |
| 2018/0093868 A1* | 4/2018 | Claeys | B66C 13/063 |
| 2018/0252921 A1* | 9/2018 | Rantala | G06F 3/0487 |
| 2018/0339196 A1* | 11/2018 | Richter | A63B 22/0076 |

FOREIGN PATENT DOCUMENTS

| | | | | |
|---|---|---|---|---|
| CN | 102030263 A | * | 4/2011 | |
| CN | 102030263 A | | 4/2011 | |
| CN | 103023412 A | * | 4/2013 | |
| CN | 104120712 A | * | 10/2014 | |
| CN | 104129712 A | | 11/2014 | |
| CN | 104555733 A | * | 4/2015 | B66C 13/063 |
| CN | 104555733 A | | 4/2015 | |
| CN | 106865416 A | * | 6/2017 | B66C 13/06 |
| CN | 106865416 A | | 6/2017 | |
| CN | 106885416 A | * | 6/2017 | |
| EP | 0583816 A1 | | 2/1994 | |
| WO | WO-2013041770 A1 | * | 3/2013 | B66C 13/06 |
| WO | WO-2017032922 A1 | * | 3/2017 | B66C 13/40 |

* cited by examiner

FIRST-ORDER DYNAMIC SLIDING MODE VARIABLE STRUCTURE-BASED BRIDGE CRANE ANTI-SWING METHOD

TECHNICAL FIELD

The present disclosure relates to the technical field of bridge cranes, and in particular to a bridge crane anti-swing method based on first-order dynamic sliding mode variable structure (SMVS).

BACKGROUND

A bridge crane system is essentially a complex under-actuated nonlinear control system, which plays an irreplaceable role in modern industrial production. Due to its high theoretical value and practical value, scholars in China and foreign countries have never interrupted researches on the positioning control problem of the bridge crane.

At present, many scholars try to combine adaptive control, fuzzy control and neural network with sliding mode control to complement each other. However, the designed controllers are more complicated and have chattering, and the variable rope length is not taken into consideration in most of the controllers. In the case of variable rope length, some scholars have adopted the hierarchical sliding mode and time-varying sliding mode control method to realize the anti-swing positioning control of the bridge crane under the condition of variable rope length, but the step of designing the control rate is relatively cumbersome and the chattering phenomenon peculiar to the sliding mode control is not taken into consideration.

SUMMARY

In order to solve the above problems, it is intended to provide a bridge crane anti-swing method based on first-order dynamic sliding mode variable structure (SMVS) in the present disclosure, which can realize the anti-swing positioning control of the system and can effectively weaken the chattering phenomenon of the SMVS control.

The present disclosure employs the following technical solutions for solving the problems.

A bridge crane anti-swing method based on first-order dynamic SMVS includes steps of:

S10: monitoring parameters of a bridge crane system in real time, and establishing a two-dimensional bridge crane system model, the two-dimensional bridge crane system model including a weight and a bridge crane for hoisting the weight, and the weight and the bridge crane being connected through a rope;

S20: determining, according to the two-dimensional bridge crane system model, position coordinates of the bridge crane and the weight, respectively:

$$\begin{cases} x_M = x \\ y_M = 0 \\ x_m = x - l\sin\theta \\ y_m = l\cos\theta \end{cases}$$

where $x_M$ and $y_M$ are the X-axis coordinate and Y-axis coordinate of the bridge crane, respectively; $x_m$ and $y_m$ are the X-axis coordinate and Y-axis coordinate of the weight, respectively; $\theta$ is the swing angle of the weight during swing; l is the length of the rope; x is the displacement of the weight in a horizontal direction during swing; and, the displacement x, the length l and the swing angle $\theta$ are parameters of the bridge crane system to be monitored in real time;

S30: determining formulae of second-order derivatives of the displacement x, the length l and the swing angle $\theta$, respectively, according to the two-dimensional bridge crane system model:

$$\ddot{x} = \frac{1}{M}(f_1 - D\dot{x} + f_2\sin\theta)$$

$$\ddot{l} = g\cos\theta + l\dot\theta^2 + \frac{(f_1 - D\dot{x})\sin\theta}{M} + \frac{f_2(M + m\sin^2\theta)}{Mm}$$

$$\ddot{\theta} = \frac{(f_1 - D\dot{x} + f_2\sin\theta)\cos\theta}{Ml} - 2\frac{\dot{l}\dot\theta}{l} - \frac{g\sin\theta}{l}$$

where M is the mass of the bridge crane, $f_1$ is a horizontal traction force suffered by the bridge crane, D is a resistance coefficient, $f_2$ is an along-rope traction force suffered by the weight, and m is the mass of the weight;

S40: constructing a crane system control model corresponding to the two-dimensional bridge crane system model, the crane system control model comprising a crane position dynamic sliding mode surface $s_1$ containing a swing angle dynamic change and a rope length dynamic sliding mode surface $s_2$ containing a rope length dynamic change, and the crane position dynamic sliding mode surface $s_1$ and the rope length dynamic sliding mode surface $s_2$ being constructed by the following formulae:

$$\begin{cases} s_1 = \dot{x} + a\dot{x} + b(x - x_d) + c\dot\theta + d\theta \\ s_2 = \dot{l} + a_1 l + b_1(l - l_d) \end{cases}$$

where $x_d$ is a displacement reference value of the bridge crane and is a constant; $l_d$ is a rope length reference value of the rope and is a constant; and, a, b, c, d, $a_1$ and $b_1$ are all constants greater than 0;

S50: performing first-order derivation on the crane position dynamic sliding mode surface $s_1$ and the rope length dynamic sliding mode surface $s_2$ by using an exponential approach law control method to obtain a first-order crane position dynamic sliding mode surface $\dot{s}_1$ and a first-order rope length dynamic sliding mode surface $\dot{s}_2$ which are separately expressed by the following formulae:

$$\begin{cases} \dot{s}_1 = \dddot{x} + a\ddot{x} + b\dot{x} + c\ddot\theta + d\dot\theta \\ \dot{s}_2 = \dddot{l} + a_1\dot{l} + b_1\dot{l} \end{cases};$$

S60: combining the second-order derivatives of the displacement x, the length l and the swing angle $\theta$ with the first-order crane position dynamic sliding mode surface $\dot{s}_1$ and a first-order rope length dynamic sliding mode surface $\dot{s}_2$ to obtain formulae of first-order derivatives of the horizontal traction force $f_1$ and the along-rope traction force $f_2$:

$$\begin{cases} \dot{f}_1 = -\sin\theta f_2 + \frac{D}{M}(f_1 - D\dot{x} + f_2\sin\theta) - \dot{\theta}\cos\theta f_2 - \\ \quad M(a\ddot{x} + b\dot{x} + c\ddot{\theta} + d\dot{\theta} + \varepsilon_1\varphi(\lambda, s_1) + k_1 s_1) \\ \dot{f}_2 = -\frac{m\sin\theta}{M + m\sin^2\theta}\dot{f}_1 - \frac{Mm}{M + m\sin^2\theta}\left[\frac{\dot{\theta}\sin 2\theta}{M}f_2 + \right. \\ \quad \frac{M(f_1 - D\dot{x})\dot{\theta}\cos\theta - D(f_1 - D\dot{x} + f_2\sin\theta)\sin\theta}{M^2} - \\ \quad \left. g\dot{\theta}\sin\theta + \dot{l}\dot{\theta}^2 + 2l\dot{\theta}\ddot{\theta} + a_1\dot{l} + b_1 l + \varepsilon_2\varphi(\lambda, s_2) + k_1 s_2\right] \end{cases}$$

where λ is a positive constant, and the function $$\varphi(\lambda, s_i) = \frac{1 - e^{-\lambda s_i}}{1 + e^{-\lambda s_i}}$$

is a bipolar Sigmoid function which has the same definition as a sign function $\text{sgn}(s_i)$;

S70: integrating the first-order derivatives of the horizontal traction force $f_1$ and the along-rope traction force $f_2$ by integrators, respectively, and cyclically adjusting and outputting the horizontal traction force $f_1$ and the along-rope traction force $f_2$ in combination with the displacement x, the length l and the swing angle θ that change in real time; and S80: applying, to the bridge crane and the weight, equivalent acting forces opposite to the horizontal traction force $f_1$ and the along-rope traction force $f_2$, respectively, to prevent the bridge crane system from swinging.

Further, in the step S30, the determining formulae of second-order derivatives of the displacement x, the length l and the swing angle θ, respectively, according to the two-dimensional bridge crane system model includes:

S31: determining a Lagrange equation of the two-dimensional bridge crane system model according to the displacement x, the length l, the swing angle θ, the horizontal traction force $f_1$ and the along-rope traction force $f_2$:

$$\begin{cases} \frac{d}{dt}\left(\frac{\partial T}{\partial \dot{x}}\right) - \frac{\partial T}{\partial x} = f_1 - D\dot{x} \\ \frac{d}{dt}\left(\frac{\partial T}{\partial \dot{l}}\right) - \frac{\partial T}{\partial l} = f_2 + mg\cos\theta \\ \frac{d}{dt}\left(\frac{\partial T}{\partial \dot{\theta}}\right) - \frac{\partial T}{\partial \theta} = -mg\sin\theta \end{cases}$$

S32: determining a nonlinear dynamic differential equation according to the Lagrange equation of the two-dimensional bridge crane system model:

$$\begin{cases} (M + m)\ddot{x} = m\ddot{l}\sin\theta - ml\ddot{\theta}\cos\theta \\ -2m\dot{\theta}l\cos\theta + ml\dot{\theta}^2\sin\theta = f_3 - D\dot{x} \\ m\ddot{l} - m\ddot{x}\sin\theta - ml\dot{\theta}^2 - mg\cos\theta = f_2 \\ ml^2\ddot{\theta} = ml\ddot{x}\cos\theta + 2ml\dot{l}\dot{\theta} + mgl\sin\theta = 0 \end{cases};$$

S33: performing formal transformation on the nonlinear dynamic differential equation of the two-dimensional bridge crane system model to obtain formulae of second-order derivatives of the displacement x, the length l and the swing angle θ, respectively.

Further, in the step S40, the crane system control model further includes a first linear operation module, a first controller, a second linear operation module, a second controller, a crane system module, a first input module for inputting the displacement reference value $x_d$ and a second input module for inputting the rope length reference value $l_d$; the first input module, the first linear operation module, the crane position dynamic sliding mode surface $s_1$, the first controller and the crane system module are connected successively, and the crane system module feeds back and outputs the swing angle θ and the displacement x to the first linear operation module and the first input module, respectively; and, the second input module, the second linear operation module, the rope length dynamic sliding mode surface $s_2$, the second controller and the crane system module are connected successively, and the crane system module feeds back and outputs the length l to the second input module.

Further, in the step S50, the relationship between the exponential approach law control method and the first-order crane position dynamic sliding mode surface $\dot{s}_1$ and the first-order rope length dynamic sliding mode surface $\dot{s}_2$ is expressed as:

$$\dot{s}_i = -\varepsilon_i\varphi(\lambda, s_i) - k_i s_i \quad i = 1, 2$$

where, $$\varphi(\lambda, s_i) = \begin{cases} 1 & \text{if } s_i > 0 \\ 0 & \text{if } s_i = 0 \\ -1 & \text{if } s_i < 0 \end{cases}.$$

Further, in the step S60, the combining the second-order derivatives of the displacement x, the length l and the swing angle θ with the first-order crane position dynamic sliding mode surface $\dot{s}_1$ and a first-order rope length dynamic sliding mode surface $\dot{s}_2$ to obtain formulae of first-order derivatives of the horizontal traction force $f_1$ and the along-rope traction force $f_2$ includes:

S61: separately substituting the second-order derivatives of the displacement x, the length l and the swing angle θ into the formulae of the first-order crane position dynamic sliding mode surface $\dot{s}_1$ and the first-order rope length dynamic sliding mode surface $\dot{s}_2$ to obtain the following formulae:

$$\begin{cases} \dot{s}_1 = \frac{1}{M}(\dot{f}_1 - D\dot{x} + \dot{f}_2\sin\theta + f_2\dot{\theta}\cos\theta) + a\dot{x} + b\dot{x} + c\ddot{\theta} + d\dot{\theta} \\ \dot{s}_3 = -g\dot{\theta}\sin\theta + \dot{l}\dot{\theta}^3 + 2l\dot{\theta}\ddot{\theta} + \frac{1}{M}[(\dot{f}_1 - D\dot{x})\sin\theta + (f_1 - D\dot{x})\dot{\theta}\cos\theta] + ; \\ \quad \frac{1}{Mm}[\dot{f}_2(M + m\sin^2\theta) + 2f_2 m\dot{\theta}\sin\theta\cos\theta] + a_i\dot{l} + b_1 l \end{cases}$$

and

S62: separately substituting the second-order derivatives of the displacement x, the length l and the swing angle θ as well as the relationship between the exponential approach law control method and the first-order crane position dynamic sliding mode surface $\dot{s}_1$ and the first-order rope length dynamic sliding mode surface $\dot{s}_2$ into the formulae of the first-order crane position dynamic sliding mode surface $\dot{s}_1$ and the first-order rope length dynamic sliding mode surface $\dot{s}_2$ to obtain formulae of first-order derivatives of the horizontal traction force $f_1$ and the along-rope traction force $f_2$.

Further, in the step S70, the integrators are arranged in the first controller and the second controller, respectively, and the first controller and the second controller output the horizontal traction force $f_1$ and the along-rope traction force $f_2$ to the crane system module, respectively.

The present disclosure has the following beneficial effects. In the bridge crane anti-swing method based on first-order dynamic SMVS, parameters of a bridge crane system are monitored in real time, and a two-dimensional bridge crane system model is established according to the parameters; formulae of second-order derivatives of the displacement x, length l and swing angle θ are established according to the related parameters in the two-dimensional bridge crane system model, respectively; and, a crane system control model is constructed, and a crane position dynamic sliding mode surface $s_1$ containing a swing angle dynamic change and a rope length dynamic sliding mode surface $s_2$ containing a rope length dynamic change are established. Since the formulae of the crane position dynamic sliding mode surface $s_1$ and rope length dynamic sliding mode surface $s_2$ are correlated with the displacement x, length l and swing angle θ, the horizontal traction force $f_1$ and the along-rope traction force $f_2$ obtained according to the crane position dynamic sliding mode surface $s_1$ and rope length dynamic sliding mode surface $s_2$ are also correlated with the displacement x, length l and swing angle θ. Therefore, when equivalent acting forces opposite to the horizontal traction force $f_1$ and the along-rope traction force $f_2$ are separately applied to the bridge crane and the weight to prevent the bridge crane system from swinging, the displacement x, length l and swing angle θ will correspondingly change. However, since the horizontal traction force $f_1$ and the along-rope traction force $f_2$ are obtained in combination with the displacement x, the length l and the swing angle θ that change in real time, and the horizontal traction force $f_1$ and the along-rope traction force $f_2$ are cyclically adjusted and output, the horizontal traction force $f_1$ and the along-rope traction force $f_2$ will be continuously adjusted with the changes in the displacement x, the length l and the swing angle θ, so that the anti-swing positioning control of the bridge crane system is realized. In addition, since a conventional sign function is replaced with a bipolar Sigmoid function in the formulae of the first-order derivatives of the horizontal traction force $f_1$ and the along-rope traction force $f_2$, and the bipolar Sigmoid function is more derivable than the conventional sign function, smooth transition can be realized, and state points in a certain range are quickly attracted to a certain Δ neighborhood of a switching surface. This neighborhood is a boundary layer of the sliding mode switching surface. In this boundary layer, a quasi-sliding mode is not required to satisfy the conditions for the sliding mode, so the switching of the control structure on the switching surface is not required, and the chattering phenomenon can be fundamentally avoided or weakened.

BRIEF DESCRIPTION OF THE DRAWINGS

The present disclosure will be further described below by embodiments with reference to the accompanying drawings.

DETAILED DESCRIPTION

Figure 1:
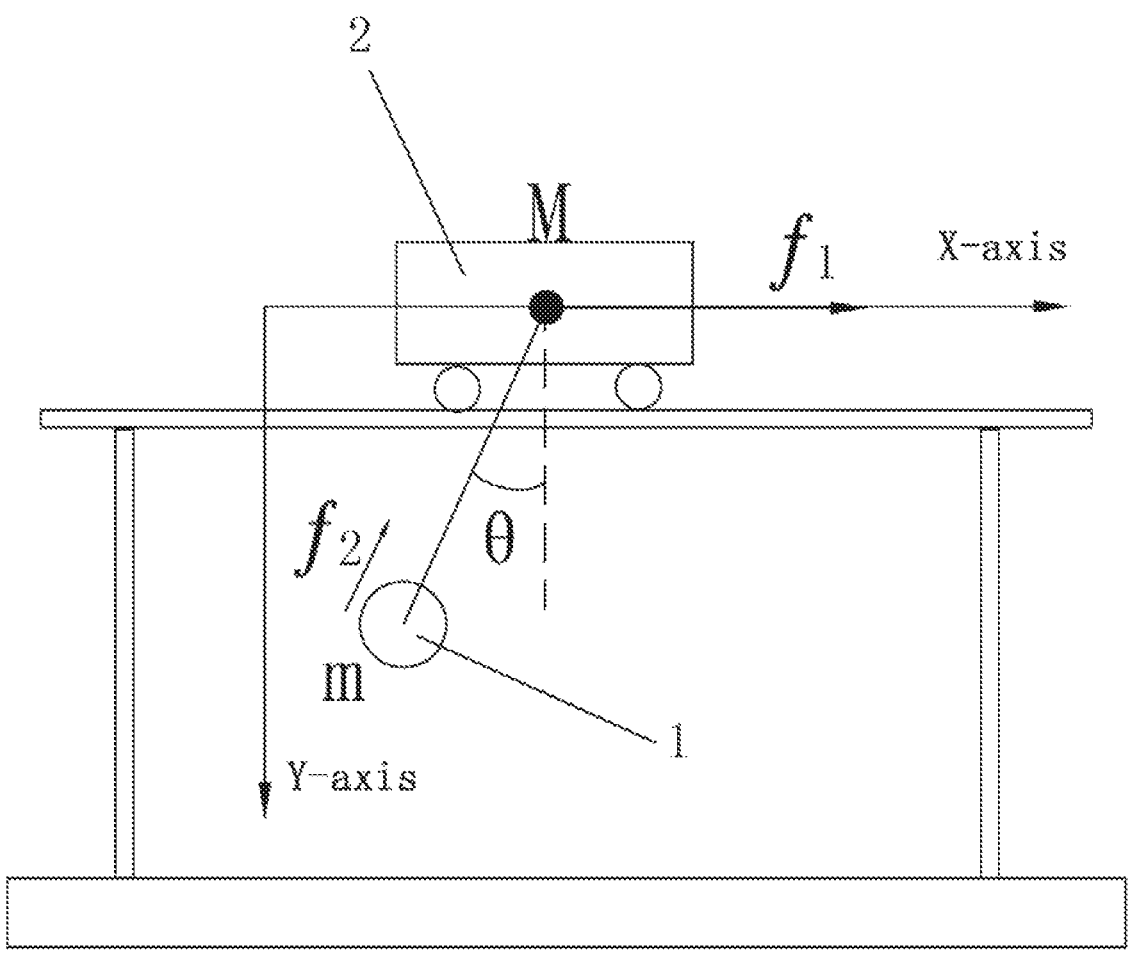
FIG. 1 is a schematic view of a two-dimensional bridge crane system model.
Figure 2:
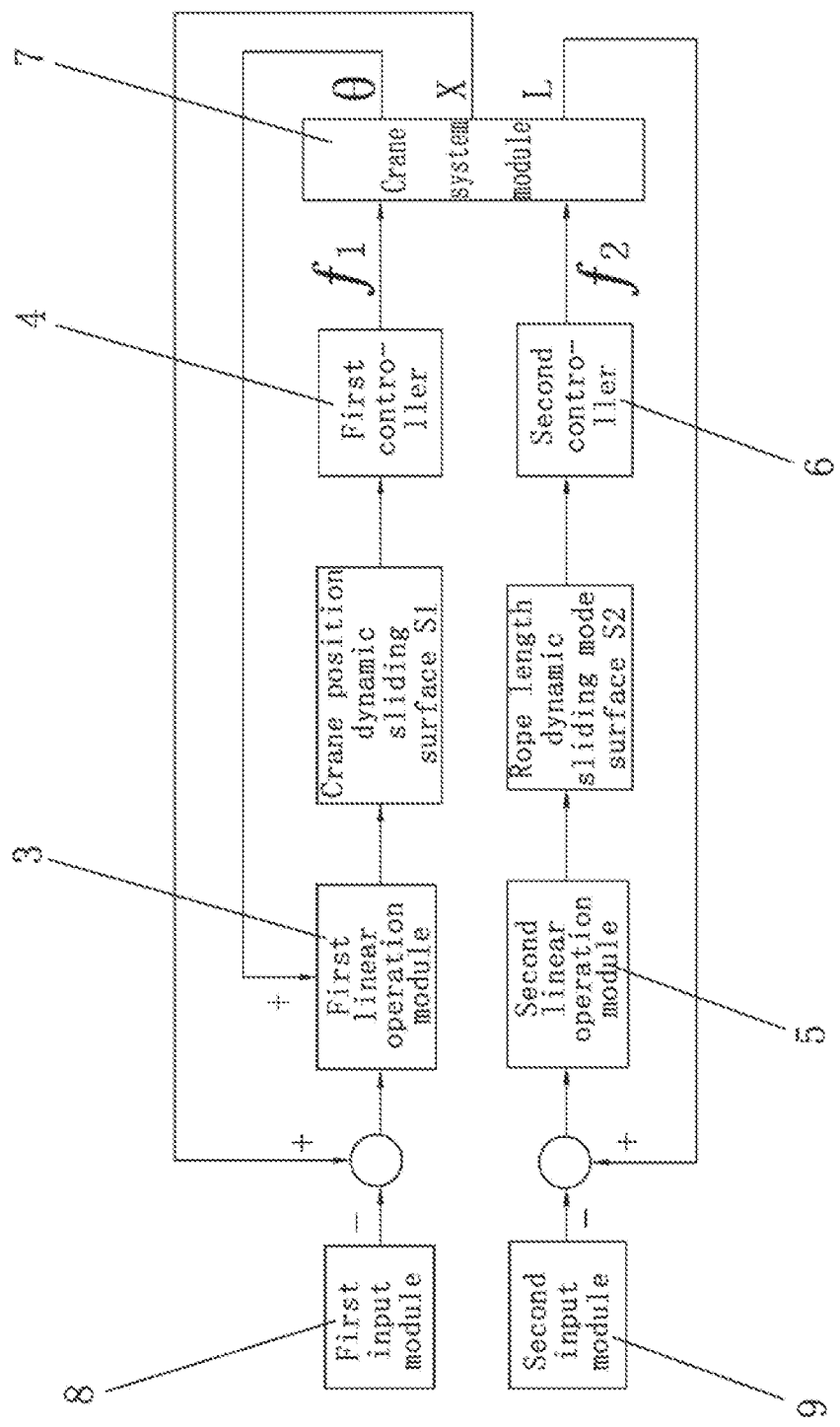
FIG. 2 is a schematic view of a crane system control model.

With reference to FIGS. 1-2, the present disclosure provides a bridge crane anti-swing method based on first-order dynamic SMVS. In view of the control problem of a two-dimensional under-actuated bridge crane in the case of a long rope, two sliding mode surfaces containing a swing angle dynamic change and a rope length dynamic change are differentiated to obtain a crane position dynamic sliding surface $s_1$ and a rope length dynamic sliding mode surface $s_2$, respectively. Since the crane position dynamic sliding surface $s_1$ and the rope length dynamic sliding mode surface $s_2$ are related to the control inputs of the crane system control model, i.e., first-order derivatives of a horizontal traction force $f_1$ and an along-rope traction force $f_2$, a dynamic sliding mode control law that is continuous in time is obtained, so that the anti-swing positioning control of the bridge crane system is realized, and the chattering phenomenon of the SMVS control can be effectively weakened.

In particular, the parameters of the bridge crane system are monitored in real time, and a two-dimensional bridge crane system model is established. With reference to FIG. 1, position coordinates of a bridge crane 2 and a weight 1 are as follows:

$$\begin{cases} x_M = x \\ y_M = 0 \\ x_m = x - l\sin\theta \\ y_m = l\cos\theta \end{cases}$$

where $x_M$ and $y_M$ are the X-axis coordinate and Y-axis coordinate of the bridge crane 2, respectively; $x_m$ and $y_m$ are the X-axis coordinate and Y-axis coordinate of the weight 1, respectively; θ is the swing angle of the weight 1 during swing; l is the length of the rope; x is the displacement of the weight 1 in a horizontal direction during swing; and, the displacement x, the length l and the swing angle θ are parameters of the bridge crane system to be monitored in real time.

Then, a Lagrange equation of the two-dimensional bridge crane system model can be obtained according to the two-dimensional bridge crane system model:

$$\begin{cases} \frac{d}{dt}\left(\frac{\partial T}{\partial \dot{x}}\right) - \frac{\partial T}{\partial x} = f_1 - D\dot{x} \\ \frac{d}{dt}\left(\frac{\partial T}{\partial \dot{l}}\right) - \frac{\partial T}{\partial l} = f_2 + mg\cos\theta \\ \frac{d}{dt}\left(\frac{\partial T}{\partial \dot{\theta}}\right) - \frac{\partial T}{\partial \theta} = -mg\sin\theta \end{cases}$$

Based on the above analysis, a nonlinear dynamic differential equation of the two-dimensional bridge crane system model can be obtained:

$$\begin{cases} (M+m)\ddot{x} = m\ddot{l}\sin\theta - ml\ddot{\theta}\cos\theta \\ -2m\dot{\theta}\dot{l}\cos\theta + ml\dot{\theta}^2\sin\theta = f_3 - D\dot{x} \\ m\ddot{l} - m\ddot{x}\sin\theta - ml\dot{\theta}^2 - mg\cos\theta = f_2 \\ ml^2\ddot{\theta} = ml\ddot{x}\cos\theta + 2ml\dot{l}\dot{\theta} + mgl\sin\theta = 0 \end{cases};$$

Formal transformation can be performed on the nonlinear dynamic differential equation to obtain formulae of second-order derivatives of the displacement x, the length l and the swing angle θ, respectively:

$$\ddot{x} = \frac{1}{M}(f_1 - D\dot{x} + f_2\sin\theta)$$

$$\ddot{l} = g\cos\theta + l\dot{\theta}^2 + \frac{(f_1 - D\dot{x})\sin\theta}{M} + \frac{f_2(M + m\sin^2\theta)}{Mm}$$

-continued $$\ddot{\theta} = \frac{(f_1 - D\dot{x} + f_2\sin\theta)\cos\theta}{Ml} - 2\frac{\dot{l}\dot{\theta}}{l} - \frac{g\sin\theta}{l}$$

where M is the mass of the bridge crane 2, $f_1$ is a horizontal traction force suffered by the bridge crane 2, D is a resistance coefficient, $f_2$ is an along-rope traction force suffered by the weight 1, and m is the mass of the weight 1.

Then, a crane system control model corresponding to the two-dimensional bridge crane system model is constructed. The crane system control model includes a crane position dynamic sliding mode surface $s_1$ containing a swing angle dynamic change, a rope length dynamic sliding mode surface $s_2$ containing a rope length dynamic change, a first linear operation module 3, a first controller 4, a second linear operation module 5, a second controller 6, a crane system module 7, a first input module 8 for inputting a displacement reference value $x_d$ and a second input module 9 for inputting a rope length reference value $l_d$. The first input module 8, the first linear operation module 3, the crane position dynamic sliding mode surface $s_1$, the first controller 4 and the crane system module 7 are connected successively, and the crane system module 7 feeds back and outputs the swing angle θ and the displacement x to the first linear operation module 3 and the first input module 8, respectively. The second input module 9, the second linear operation module 5, the rope length dynamic sliding mode surface $s_2$, the second controller 6 and the crane system module 7 are connected successively, and the crane system module 7 feeds back and outputs the length l to the second input module 9. It can be seen from the structure of the crane system control model that there is mutual affection between the displacement x, the length l and the swing angle θ, and the horizontal traction force $f_1$ and the along-rope traction force $f_2$. When equivalent acting forces opposite to the horizontal traction force $f_1$ and the along-rope traction force $f_2$ are separately applied to the bridge crane 2 and the weight 1 to prevent the bridge crane system from swinging, the displacement x, the length l and the swing angle θ will correspondingly change. In this case, the feedback of the displacement x, the length l and the swing angle θ will affect the changes in the horizontal traction force $f_1$ and the along-rope traction force $f_2$. Therefore, by cyclically adjusting and outputting the horizontal traction force $f_1$ and the along-rope traction force $f_2$, the anti-swing positioning control of the bridge crane system is realized.

The relationship between the displacement x, the length l, the swing angle θ and the horizontal traction force $f_1$ and the along-rope traction force $f_2$ will be analyzed below.

The crane position dynamic sliding mode surface $s_1$ and the rope length dynamic sliding mode surface $s_2$ are constructed by the following formulae:

$$\begin{cases} s_1 = \dot{x} + a\ddot{x} + b(x - x_d) + c\dot{\theta} + d\theta \\ s_2 = \dot{l} + a_1 \ddot{l} + b_1(l - l_d) \end{cases}$$

where $x_d$ is the displacement reference value of the bridge crane 2 and is a constant; $l_d$ is the rope length reference value of the rope and is a constant; and, a, b, c, d, $a_1$ and $b_1$ are all constants greater than 0.

First-order derivation is performed on the crane position dynamic sliding mode surface $s_1$ and the rope length dynamic sliding mode surface $s_2$ by using an exponential approach law control method to obtain a first-order crane position dynamic sliding mode surface $\dot{s}_1$ and a first-order rope length dynamic sliding mode surface $\dot{s}_2$, which are separately expressed by the following formulae:

$$\begin{cases} \dot{s}_1 = \dddot{x} + a\ddot{x} + b\dot{x} + c\ddot{\theta} + d\dot{\theta} \\ \dot{s}_2 = \dddot{l} + a_1 \ddot{l} + b_1 \dot{l} \end{cases}$$

The relationship between the exponential approach law control method and the first-order crane position dynamic sliding mode surface $\dot{s}_1$ and the first-order rope length dynamic sliding mode surface $\dot{s}_2$ is expressed as:

$$\dot{s}_i = -\varepsilon_i \varphi(\lambda, s_i) - k_i s_i \quad i = 1, 2$$

where, $$\varphi(\lambda, s_i) = \frac{1 - e^{-\lambda s_i}}{1 + e^{-\lambda s_i}} = \begin{cases} 1 & \text{if } s_i > 0 \\ 0 & \text{if } s_i = 0 \\ -1 & \text{if } s_i < 0 \end{cases};$$

λ is a positive constant, and the function $\Phi(\lambda, s_i)$ is a bipolar Sigmoid function which has the same definition as a sign function $\text{sgn}(s_i)$.

Therefore, when the second-order derivatives of the displacement x, the length l and the swing angle θ are separately substituted into the formulae of the first-order crane position dynamic sliding mode surface $\dot{s}_1$ and the first-order rope length dynamic sliding mode surface $\dot{s}_2$, the following formulae can be obtained:

$$\begin{cases} \dot{s}_1 = \frac{1}{M}(\dot{f}_1 - D\ddot{x} + \dot{f}_2 \sin\theta + f_2 \dot{\theta}\cos\theta) + a\ddot{x} + b\dot{x} + c\ddot{\theta} + d\dot{\theta} \\ \dot{s}_2 = -g\dot{\theta}\sin\theta + \dot{l}\dot{\theta}^2 + 2l\dot{\theta}\ddot{\theta} + \frac{1}{M}\left[(\dot{f}_1 - D\ddot{x})\sin\theta + (f_1 - D\dot{x})\dot{\theta}\cos\theta\right] + ; \\ \quad \frac{1}{Mm}\left[\dot{f}_2(M + m\sin^2\theta) + 2f_2 m\dot{\theta}\sin\theta\cos\theta\right] + a_1 \ddot{l} + b_1 \dot{l} \end{cases}$$

Then, the second-order derivatives of the displacement x, the length l and the swing angle θ as well as the relationship between the exponential approach law control method and the first-order crane position dynamic sliding mode surface $\dot{s}_1$ and the first-order rope length dynamic sliding mode surface $\dot{s}_2$ are separately substituted into the formulae of the first-order crane position dynamic sliding mode surface $\dot{s}_1$ and the first-order rope length dynamic sliding mode surface $\dot{s}_2$ to obtain formulae of first-order derivatives of the horizontal traction force $f_1$ and the along-rope traction force $f_2$:

$$\begin{cases} \dot{f}_1 = -\sin\theta \dot{f}_2 + \frac{D}{M}(f_1 - D\dot{x} + f_2\sin\theta) - \dot{\theta}\cos\theta f_2 - \\ \quad M(a\ddot{x} + b\dot{x} + c\ddot{\theta} + d\dot{\theta} + \varepsilon_1 \varphi(\lambda, s_1) + k_1 s_1) \\ \dot{f}_2 = -\frac{m\sin\theta}{M + m\sin^2\theta} \dot{f}_1 - \frac{Mm}{M + m\sin^2\theta}\left[\frac{\dot{\theta}\sin 2\theta}{M} f_2 + \right. ; \\ \quad \frac{M(f_1 - D\dot{x})\dot{\theta}\cos\theta - D(f_1 - D\dot{x} + f_2\sin\theta)\sin\theta}{M^2} - \\ \left. g\dot{\theta}\sin\theta + \dot{l}\dot{\theta}^2 + 2l\dot{\theta}\ddot{\theta} + a_3 \ddot{l} + b_1 \dot{l} + \varepsilon_2 \varphi(\lambda, s_2) + k_3 s_2\right] \end{cases}$$

At this time, the above formulae indicate relationship of the mutual affections among the displacement x, the length l, the swing angle θ, and the horizontal traction force $f_1$ and the along-rope traction force $f_2$. Since the integrators are arranged in the first controller 4 and the second controller 6, and the first controller 4 and the second controller 6 output the horizontal traction force $f_1$ and the along-rope traction force $f_2$ to the crane system module 7, respectively, the first-order derivatives of the horizontal traction force $f_1$ and the along-rope traction force $f_2$ are integrated in the first controller 4 and the second controller 6 and then converted into the horizontal traction force $f_1$ and the along-rope traction force $f_2$. Then, the horizontal traction force $f_1$ and the along-rope traction force $f_2$ are input into the crane system module 7 to change the displacement x, the length l, the swing angle θ. At this time, the feedback of the displacement x, the length l, the swing angle θ will affect the horizontal traction force $f_1$ and the along-rope traction force $f_2$, so that the output values of the horizontal traction force $f_1$ and the along-rope traction force $f_2$ are cyclically adjusted continuously. At this time, equivalent acting forces opposite to the horizontal traction force $f_1$ and the along-rope traction force $f_2$ are separately applied to the bridge crane 2 and the weight 1 according to the changes of the output values of the horizontal traction force $f_1$ and the along-rope traction force $f_2$, so that the anti-swing positioning control of the bridge crane system is realized.

In addition, since a conventional sign function is replaced with a bipolar Sigmoid function in the formulae of the first-order derivatives of the horizontal traction force $f_1$ and the along-rope traction force $f_2$, and the bipolar Sigmoid function is more derivable than the conventional sign function, smooth transition can be realized, and state points in a certain range are quickly attracted to a certain Δ neighborhood of a switching surface. This neighborhood is a boundary layer of the sliding mode switching surface. In this boundary layer, the quasi-sliding mode is not required to satisfy the conditions for the sliding mode, so the switching of the control structure on the switching surface is not required, and the chattering phenomenon can be fundamentally avoided or weakened.

Although the preferred embodiments of the present disclosure have been described in detail above, the present disclosure is not limited the embodiments. Those skilled in the art may make various equivalent variations or substitutions without departing from the spirit of the present disclosure, and these equivalent variations or substitutions shall fall into the scope defined by the appended claims of the present application.

The invention claimed is:

1. A bridge crane anti-swing method based on first-order dynamic sliding mode variable structure, comprising steps of:

monitoring parameters of a bridge crane system in real time, and establishing a two-dimensional bridge crane system model having a weight, and a bridge crane for hoisting the weight by a rope connecting between the weight and the bridge crane;

determining, according to the two-dimensional bridge crane system model, position coordinates of the bridge crane and the weight, respectively by formulae of:

$$\begin{cases} x_M = x \\ y_M = 0 \\ x_m = x - l\sin\theta \\ y_m = l\cos\theta \end{cases}$$

where $x_M$ and $y_M$ are the X-axis coordinate and Y-axis coordinate of the bridge crane, respectively; $x_m$ and $y_m$ are the X-axis coordinate and Y-axis coordinate of the weight, respectively; θ is the swing angle of the weight during swing; l is the length of the rope; x is the displacement of the weight in a horizontal direction during swing; and, the displacement x, the length l and the swing angle θ are parameters of the bridge crane system to be monitored in real time;

determining formulae of second-order derivatives of the displacement x, the length l and the swing angle θ, respectively, according to the two-dimensional bridge crane system model:

$$\ddot{x} = \frac{1}{M}(f_1 = D\dot{x} + f_2\sin\theta)$$

$$\ddot{l} = g\cos\theta + l\dot{\theta}^2 + \frac{(f_1 - D\dot{x})\sin\theta}{M} + \frac{f_2(M + m\sin^2\theta)}{Mm}$$

$$\ddot{\theta} = \frac{(f_1 - D\dot{x} + f_2\sin\theta)}{Ml} - 2\frac{\dot{l}\dot{\theta}}{l} - \frac{g\sin\theta}{l}$$

where M is the mass of the bridge crane, $f_1$ is a horizontal traction force suffered by the bridge crane, D is a resistance coefficient, $f_2$ is an along-rope traction force suffered by the weight, and m is the mass of the weight;

constructing a crane system control model corresponding to the two-dimensional bridge crane system model, the crane system control model comprising a crane position dynamic sliding mode surface $s_1$ containing a swing angle dynamic change and a rope length dynamic sliding mode surface $s_2$ containing a rope length dynamic change, and the crane position dynamic sliding mode surface $s_1$ and the rope length dynamic sliding mode surface $s_2$ being constructed by the following formulae:

$$\begin{cases} s_1 = \dot{x} + a\dot{x} + b(x - x_d) + c\dot{\theta} + d\theta \\ s_2 = \dot{l} + a_1 l + b_1(l - l_d) \end{cases}$$

where $x_d$ is a displacement reference value of the bridge crane and is a constant; $l_d$ is a rope length reference value of the rope and is a constant; and, a, b, c, d, $a_1$ and $b_1$ are all constants greater than 0;

performing first-order derivation on the crane position dynamic sliding mode surface $s_1$ and the rope length dynamic sliding mode surface $s_2$ by using an exponential approach law control method to obtain a first-order crane position dynamic sliding mode surface $\dot{s}_1$ and a first-order rope length dynamic sliding mode surface $\dot{s}_2$, which are separately expressed by the following formulae:

$$\begin{cases} \dot{s}_1 = \ddot{x} + a\ddot{x} + b\dot{x} + c\ddot{\theta} + d\dot{\theta} \\ \dot{s}_2 = \ddot{l} + a_1\dot{l} + b_1\dot{l} \end{cases};$$

combining the second-order derivatives of the displacement x, the length l and the swing angle θ with the first-order crane position dynamic sliding mode surface $\dot{s}_1$ and a first-order rope length dynamic sliding mode surface $\dot{s}_2$ to obtain formulae of first-order derivatives of the horizontal traction force $f_1$ and the along-rope traction force $f_2$:

$$\begin{cases} \dot{f}_1 = -\sin\theta \dot{f}_2 + \dfrac{D}{M}(f_1 - D\dot{x} + f_2\sin\theta) - \dot{\theta}\cos\theta f_2 - \\ \qquad M(a\dot{x} + b\dot{x} + c\ddot{\theta} + d\dot{\theta} + \varepsilon_1\varphi(\lambda, s_1) + k_1 s_1) \\ \dot{f}_2 = -\dfrac{m\sin\theta}{M + m\sin^2\theta} \dot{f}_1 - \dfrac{Mm}{M + m\sin^2\theta}\left[\dfrac{\dot{\theta}\sin 2\theta}{M} \dot{f}_2 + \right. \\ \qquad \dfrac{M(f_1 - D\dot{x})\dot{\theta}\cos\theta - D(f_1 - D\dot{x} + f_2\sin\theta)\sin\theta}{M^2} - \\ \qquad \left. g\dot{\theta}\sin\theta + \dot{l}\dot{\theta}^2 + 2l\dot{\theta}\ddot{\theta} + a_1\dot{l} + b_1\dot{l} + \varepsilon_2\varphi(\lambda, s_2) + k_1 s_2\right] \end{cases} ;$$

where λ is a positive constant, and the function $$\varphi(\lambda, s_i) = \dfrac{1 - e^{-\lambda s_i}}{1 + e^{-\lambda s_i}}$$

is a bipolar Sigmoid function which has the same definition as a sign function sgn($s_i$);

integrating the first-order derivatives of the horizontal traction force $f_1$ and the along-rope traction force $f_2$ by integrators, respectively, and cyclically adjusting and outputting the horizontal traction force $f_1$ and the along-rope traction force $f_2$ in combination with the displacement x, the length l and the swing angle θ that change in real time; and applying, to the bridge crane and the weight, equivalent acting forces opposite to the horizontal traction force $f_1$ and the along-rope traction force $f_2$, respectively, to prevent the bridge crane system from swinging.

2. The bridge crane anti-swing method based on first-order dynamic sliding mode variable structure according to claim 1, wherein, in the step of determining formulae of second-order derivatives of the displacement x, the length l and the swing angle θ, respectively, according to the two-dimensional bridge crane system model comprises:

determining a Lagrange equation of the two-dimensional bridge crane system model according to the displacement x, the length l, the swing angle θ, the horizontal traction force $f_1$ and the along-rope traction force $f_2$:

$$\begin{cases} \dfrac{d}{dt}\left(\dfrac{\partial T}{\partial \dot{x}}\right) - \dfrac{\partial T}{\partial x} = f_1 - D\dot{x} \\ \dfrac{d}{dt}\left(\dfrac{\partial T}{\partial \dot{l}}\right) - \dfrac{\partial T}{\partial l} = f_2 + mg\cos\theta \\ \dfrac{d}{dt}\left(\dfrac{\partial T}{\partial \dot{\theta}}\right) - \dfrac{\partial T}{\partial \theta} = -mg\sin\theta \end{cases} ;$$

determining a nonlinear dynamic differential equation according to the Lagrange equation of the two-dimensional bridge crane system model:

$$\begin{cases} (M + m)\ddot{x} - m\ddot{l}\sin\theta - ml\ddot{\theta}\cos\theta \\ \quad -2m\dot{\theta}\dot{l}\cos\theta + ml\dot{\theta}^2\sin\theta = f_1 - D\dot{x} \\ m\ddot{l} - m\ddot{x}\sin\theta - ml\dot{\theta}^2 - mg\cos\theta = f_2 \\ ml^2\ddot{\theta} - ml\ddot{x}\cos\theta + 2ml\dot{l}\dot{\theta} + mgl\sin\theta = 0 \end{cases} ;$$

and performing formal transformation on the nonlinear dynamic differential equation of the two-dimensional bridge crane system model to obtain formulae of second-order derivatives of the displacement x, the length l and the swing angle θ, respectively.

3. The bridge crane anti-swing method based on first-order dynamic sliding mode variable structure according to claim 1, wherein: the crane system control model further comprises a first linear operation module, a first controller, a second linear operation module, a second controller, a crane system module, a first input module for inputting the displacement reference value $x_d$ and a second input module for inputting the rope length reference value $l_d$; the first input module, the first linear operation module, the crane position dynamic sliding mode surface $s_1$, the first controller and the crane system module are connected successively, and the crane system module feeds back and outputs the swing angle θ and the displacement x to the first linear operation module and the first input module, respectively; and, the second input module, the second linear operation module, the rope length dynamic sliding mode surface $s_2$, the second controller and the crane system module are connected successively, and the crane system module feeds back and outputs the length l to the second input module.

4. The bridge crane anti-swing method based on first-order dynamic sliding mode variable structure according to claim 1, wherein, in the step of performing first-order derivation on the crane position dynamic sliding mode surface $s_1$ and the rope length dynamic sliding mode surface $s_2$, the relationship between the exponential approach law control method and the first-order crane position dynamic sliding mode surface $\dot{s}_1$ and the first-order rope length dynamic sliding mode surface $\dot{s}_2$ is expressed as:

$$\dot{s}_i = -\varepsilon_i\varphi(\lambda, s_i) - k_i s_i \quad i = 1, 2$$

where, $$\varphi(\lambda, s_i) = \begin{cases} 1 & \text{if } s_i > 0 \\ 0 & \text{if } s_i = 0 \\ -1 & \text{if } s_i < 0 \end{cases} .$$

5. The bridge crane anti-swing method based on first-order dynamic sliding mode variable structure according to claim 4, wherein, in the step of combining the second-order derivatives of the displacement x, the length l and the swing angle θ with the first-order crane position dynamic sliding mode surface $\dot{s}_1$ and a first-order rope length dynamic sliding mode surface $\dot{s}_2$ to obtain formulae of first-order derivatives of the horizontal traction force $f_1$ and the along-rope traction force $f_2$ comprises:

separately substituting the second-order derivatives of the displacement x, the length l and the swing angle θ into the formulae of the first-order crane position dynamic sliding mode surface $\dot{s}_1$ and the first-order rope length dynamic sliding mode surface $\dot{s}_2$ to obtain the following formulae:

$$\begin{cases} \dot{s}_1 = \dfrac{1}{M}(f_1 - D\dot{x} + f_2\sin\theta + f_2\dot{\theta}\cos\theta) + a\dot{x} + b\dot{x} + c\ddot{\theta} + d\dot{\theta} \\ \dot{s}_2 = -g\dot{\theta}\sin\theta + \dot{l}\dot{\theta}^2 + 2l\dot{\theta}\ddot{\theta} + \dfrac{1}{M}\left[(f_1 - D\dot{x})\sin\theta + (f_1 - D\dot{x})\dot{\theta}\cos\theta\right] + \\ \qquad \dfrac{1}{Mm}\left[f_2(M + m\sin^2\theta) + 2f_2 m\dot{\theta}\sin\theta\cos\theta\right] + a_1\dot{l} + b_1\dot{l} \end{cases}$$

and separately substituting the second-order derivatives of the displacement x, the length l and the swing angle θ as well as the relationship between the exponential approach law control method and the first-order crane position dynamic sliding mode surface $\dot{s}_1$ and the first-order rope length dynamic sliding mode surface $\dot{s}_2$ into the formulae of the first-order crane position dynamic sliding mode surface $\dot{s}_1$ and the first-order rope length dynamic sliding mode surface $\dot{s}_2$ to obtain formulae of first-order derivatives of the horizontal traction force $f_1$ and the along-rope traction force $f_2$.

6. The bridge crane anti-swing method based on first-order dynamic sliding mode variable structure according to claim 3, wherein:

the integrators are arranged in the first controller and the second controller, respectively, and the first controller and the second controller output the horizontal traction force $f_1$ and the along-rope traction force $f_2$ to the crane system module, respectively.

* * * * *